(12) United States Patent
Bichler et al.

(10) Patent No.: US 8,888,038 B2
(45) Date of Patent: Nov. 18, 2014

(54) DRIVEN AIRCRAFT, IN PARTICULAR AN AIRCRAFT DESIGNED AS A FLYING WING AND/OR HAVING A LOW RADAR SIGNATURE

(75) Inventors: Bartholomaeus Bichler, Raubling (DE); Jochen Dornwald, Munich (DE); Gerhard Wedekind, Immenstaad (DE)

(73) Assignee: EADS Deutschland GmbH, Ottobrunn (DE)

( * ) Notice: Subject to any disclaimer, the term of this patent is extended or adjusted under 35 U.S.C. 154(b) by 39 days.

(21) Appl. No.: 13/704,545

(22) PCT Filed: Jun. 14, 2011

(86) PCT No.: PCT/DE2011/001218
§ 371 (c)(1),
(2), (4) Date: Dec. 14, 2012

(87) PCT Pub. No.: WO2012/010116
PCT Pub. Date: Jan. 26, 2012

(65) Prior Publication Data
US 2013/0206920 A1    Aug. 15, 2013

(30) Foreign Application Priority Data
Jun. 16, 2010    (DE) .......................... 10 2010 023 938

(51) Int. Cl.
*B64D 33/02*      (2006.01)
*B64C 39/10*      (2006.01)
*B64D 27/16*      (2006.01)

(52) U.S. Cl.
CPC ................ *B64D 33/02* (2013.01); *B64C 39/10* (2013.01); *B64C 2039/105* (2013.01); *B64D 27/16* (2013.01); *B64D 2033/0286* (2013.01)
USPC .......................................... 244/53 B; 244/55

(58) Field of Classification Search
CPC .... B64C 39/10; B64C 33/02; B64C 2039/00; B64C 2201/028; B64C 2039/05; B64C 2039/105; B64D 27/16; B64D 27/02; B64D 27/12; B64D 27/18; B64D 27/14
USPC ....................................... 244/13, 36, 53 B, 55
See application file for complete search history.

(56) References Cited

U.S. PATENT DOCUMENTS 3,576,300 A * 4/1971 Palfreyman ..................... 244/36
4,568,042 A * 2/1986 Carr ................................ 244/13
(Continued)

FOREIGN PATENT DOCUMENTS

FR    2 888 211 A1    1/2007
WO    WO 2006/049553 A1    5/2006
WO    WO 2006/049555 A1    5/2006

OTHER PUBLICATIONS

International Search Report dated May 22, 2012 including partial English-language translation (Six (6) pages).

(Continued)

*Primary Examiner* — Benjamin P Lee
(74) *Attorney, Agent, or Firm* — Crowell & Moring LLP (57) ABSTRACT

An aircraft is provided includes at least one drive flow passage, which runs from an air inlet directed forward on the body surface via a jet engine through the body to a jet nozzle that opens towards the rear on the body surface. At least a part of the jet engine is arranged upstream of the air inlet seen in the flight direction of the aircraft and the drive flow passage has curvature sections embodied and arranged for this in a suitable manner.

8 Claims, 3 Drawing Sheets

(56) References Cited

U.S. PATENT DOCUMENTS

| | | | |
|---|---|---|---|
| 4,901,947 A * | 2/1990 | Raymer | 244/12.5 |
| 5,779,169 A * | 7/1998 | Sloan | 244/12.3 |
| 7,628,356 B2 | 12/2009 | Buffenoir et al. | |
| 7,665,689 B2 * | 2/2010 | McComb | 244/12.3 |
| 7,823,838 B1 * | 11/2010 | De ning et al. | 244/198 |
| 8,262,031 B2 * | 9/2012 | Zha et al. | 244/208 |
| 8,393,566 B2 * | 3/2013 | Siercke et al. | 244/53 B |
| 2005/0178884 A1 * | 8/2005 | Schafroth | 244/36 |

OTHER PUBLICATIONS

German-language Written Opinion (PCT/ISA/237) (Six (6) pages).

* cited by examiner

DRIVEN AIRCRAFT, IN PARTICULAR AN AIRCRAFT DESIGNED AS A FLYING WING AND/OR HAVING A LOW RADAR SIGNATURE

BACKGROUND AND SUMMARY OF THE INVENTION

Exemplary embodiments of the present invention relate to a driven aircraft with a fuselage and wing body and at least one drive flow passage, which runs from an air inlet directed forwards on the body surface via a jet engine through the body to a jet nozzle that opens towards the rear on the body surface.

The strategic long range bomber "Northrop B-2 Spirit" (FIG. 1) as well as the unmanned combat air vehicle (UCAV) "Boeing X-45" (FIG. 2) and "Northrop Grumman X-47 Pegasus" (FIG. 3) are cited here as examples of generic aircraft of this type. The above aircraft names and representations (FIGS. 1-3) were found during a search of the Internet in May 2010. Aircraft of this type are also described in patent publications WO 2006/039553A1, FR 2 888 211 A1, and WO 2006/049555A1.

These aircraft, cited above merely by way of example, commonly include two special features in connection with one another, namely on the one hand a more or less "minimalist" design of a fuselage and wing body (corresponding to the so-called flying-wing aircraft principle) and on the other hand a low radar signature.

A low radar signature, equivalent to a low likelihood of a discovery of the aircraft by means of radar, can be achieved or promoted, e.g., by energy-absorbing paint coats, energy-conducting seals of outer skin joints, fewer and larger instead of many small service flaps, accommodation of loads in interior ducts instead of as exterior loads and further measures.

In particular, an aircraft that is to have only an extremely low radar signature must have a very simple exterior geometry with an avoidance or targeted alignment of body surfaces and body edges. Unfavorably arranged surfaces such as, e.g., vertically aligned vertical tail plane surfaces cause so much radar backscatter that an extremely low signature can no longer be achieved. For this reason with respect to a low radar signature an overwhelming advantage results with a design of the fuselage and wing body that follows at least approximately the flying-wing aircraft principle and thus does not have a particularly marked fuselage or a flowing transition between fuselage and wings.

A basic geometry that is particularly favorable in terms of signature appears to be a simple delta configuration with a certain trailing edge sweep, which does not have a marked fuselage and as far as possible should be developable. Although a trailing edge with points can also be considered, such as e.g., with a body with wings in so-called lambda configuration (cf. e.g. FIGS. 1 and 2), a certain deterioration with respect to the radar signature results with a lambda configuration of this type. To achieve an extremely low radar signature therefore a simple delta configuration (cf. e.g. FIG. 3) is a much better solution.

The design or basic geometry of the aircraft body (in particular e.g., in the manner shown in FIG. 3) explained above and advantageously, although not indispensably, for achieving a low radar signature has at least the disadvantage of gravely impaired flight properties as far as an aerodynamically unstable flying behavior. With these body designs the so-called aerodynamic neutral point seen in the flight direction lies relatively far forward. Taking into consideration the requirement that the center of gravity of the aircraft thus likewise has to lie relatively far forward, it is difficult to properly utilize the volume (above all generously available in the rear region) of the aircraft body because front regions would have to be filled as far as possible with components of high density (such as e.g., engine(s), weapon duct(s), equipment, fuel tank(s) etc.), whereas rear areas would have to be filled with components of lower density (such as e.g., air pipes, nozzle pipes, etc.). Because there is too little space available for this in the front body region and the individual components of course cannot be distributed in the body in a completely arbitrary manner this is not so easily possible in practice.

One particular problem associated with known aircraft of the type mentioned at the outset is with respect to the drive by means of a drive flow passage starting from an air inlet via a jet engine running through the body to a jet nozzle.

With the known aircraft, one or more of these drive flow passages runs against the flight direction through the aircraft body. If the (relatively dense) engine is now arranged relatively far forward for the above-referenced reasons, accordingly the air inlet is likewise located relatively far forward, which, however, is extremely detrimental to a low radar signature. Air inlets located forward are a highly problematic component with respect to a low radar signature because the cavities formed therewith tend to radiate incident radar waves again in a very broad aspect range. A "radar glance cast" from the front on the engine is also critical because rotating engine components lead to a modulation of the reflected radar signal and in this manner can make it possible to recognize the aircraft (together with the identification of the aircraft model).

A further inherent problem of air inlets is that under sideslip angles they generate a lateral force that depends on the shape of the inlet and the mass flow rate of the adjoining drive flow passage. In particular, in yawing flight air inlets installed relatively far forward thus generate a yawing moment destabilizing the aircraft, which yawing moment has to be compensated for in some way and in particular with a missing vertical tailplane can lead to grave problems with respect to flight stability.

Exemplary embodiments of the present invention are directed to an aircraft of the type mentioned at the outset that provides a greater freedom of design with respect to the shaping of the body, in particular a body in the manner of an flying-wing aircraft with improved flight properties compared to known aircraft, and/or to achieve a reduction of the radar signature of the aircraft.

The aircraft according to the invention is configured such that at least a part of the jet engine, in particular the entire jet engine, is arranged upstream of the air inlet seen in the flight direction of the aircraft and the drive flow passage has curvature sections embodied and arranged for this in a suitable manner.

In accordance with the present invention, the conventional relative arrangement of air inlet and jet engine is abandoned and the positions of these components are "uncoupled" from one another. The aircraft according to the invention shifts the jet engine is forwards and/or shifts the air inlet to the rear compared to conventional aircraft.

Advantageously, the center of gravity of the aircraft can thus be shifted forwards, which increases flight stability (or reduces flight instability) for a fuselage and wing body with aerodynamic neutral point lying relatively far forwards. The stability problems of body designs of this type are thus considerably alleviated with the invention.

According to an embodiment the body is essentially embodied with an all-wing design. In a special embodiment the front wing edges run (preferably respectively essentially in a straight line) with positive sweep (preferably at least 40°)

up to a nose of the aircraft, and the rear wing edges run (preferably respectively essentially in a straight line) with a negative sweep (preferably in the range between 10° and 30°) up to a tailpiece of the aircraft.

The positions of the jet engine and of the air inlet can be selected or adapted to the desired aerodynamic and/or radar signature-related properties of the aircraft virtually as desired. In the case of predetermined positions of jet engine and air inlet, then a flow passage connecting these components and a flow passage connecting the engine output with the jet nozzle can be established. The precise course of these flow passages can be freely selected within certain limits. In principle only the positions of the air inlet, the jet engine and the jet nozzle have to be taken into consideration as "fixed points" of these flow passages.

Since at least one part of the jet engine is arranged upstream of the air inlet seen in the flight direction of the aircraft, the drive flow passage must have at least two curvature sections for flow deflection.

At least one curvature section is necessary in order to feed the incoming air to an input (e.g., compressor stage) of the jet engine. If the jet engine is hereby provided in the "normal installation position," that is, with thrust direction against the flight direction, two curvature sections are already necessary in the region of this feed flow passage. A further curvature section in the passage between jet engine and jet nozzle can be necessary if the jet engine is not installed exactly in the flight direction (to be more precise: antiparallel to the desired thrust direction).

However, if the jet engine is oriented forwards in the "inverted installation position," that is, with the engine output (e.g., combustion chamber, optionally with afterburner), one curvature section is already sufficient to feed the incoming air to the engine input. However, in this case at least one second curvature section is necessary in the flow passage between the engine output and the jet nozzle.

Naturally, the curvature sections (as well as the other sections) should also be embodied and arranged as far as possible in a flow-optimized manner, that is, with low flow resistance.

In one embodiment at least one, in particular all of the curvature sections of the drive flow passage provide a flow deflection by essentially 180°. This should include in particular deflection angles in the range of 160° to 200°, for example, in the range of 170° to 190°. The curvature of the flow course caused by a curvature section can be provided in a single-axis or double-axis manner.

Further advantages of the invention are shown by the shift of the position of the air inlet to the rear are thereby rendered possible. Due to the relatively light (less dense) flow passage located between an air inlet of this type and the jet engine (arranged relatively far forwards), the advantageous forward shift of the center of gravity is promoted. Furthermore, with air inlets arranged relatively far to the rear, the problems mentioned at the outset of the generation of unstable yawing moments can be alleviated. In the event that an air inlet is provided in the center of the transverse extension of the aircraft, the same applies analogously for an otherwise possibly destabilizing pitching moment.

In one embodiment the body surface has a design that reduces the radar signature of the aircraft. In this respect, in particular designs according to an all-wing concept and/or with wings in (preferably) delta or (less preferably) lambda geometry are advantageous.

A design "that reduces the radar signature" should be present when at least for the (particularly critical) front aspect region, that is, with a "radar glance from the front" a signature is present which corresponds to a radar backscatter surface of less than 10%, in particular less than 1% of that surface that would result with a conventional design of an aircraft of the same size and basic geometry.

In this respect, the shift of air inlets to the rear rendered possible according to the invention provides the further serious advantage that air inlets of this type (at least in the front aspect region) are now difficult to recognize by radar, if they can be recognized by radar at all. Furthermore, through the curvature section present in the course of the air inflow passage a direct radar view of the jet engine is also effectively prevented when the air inlet is visible from the radar device. The (at least one) curvature section provided with the invention has an additional use in this respect to a certain extent.

In one embodiment the air inlet is arranged downstream of the center of gravity of the aircraft and/or downstream of the geometric centroid of the contour of the body seen from above seen in the flight direction. Particularly major advantages can be achieved therewith with respect to flight stability and the low radar signature.

In one embodiment the opening of the air inlet is delimited on its outside by a region of the body tapering forwards, for example tapering to a point. This represents a sometimes favorable design for a low radar signature of the air inlet. Furthermore, this design can have advantages in terms of fluid mechanics with respect to the most efficient possible air inlet. The body region widening towards the rear provides a certain "run length" for the air flowing in, before this reaches the curvature section of the drive flow passage arranged e.g., relatively closely downstream of the air inlet.

In one embodiment the drive flow passage is embodied at least in part in a two-fold manner, symmetrically to a vertical longitudinal center plane of the body. Alternatively to the "two-fold" embodiment, a three-fold, four-fold etc. embodiment is also possible.

In one embodiment, several drive flow passages including associated air inlets, jet engines and possibly also jet nozzles are arranged completely separately from one another.

In another embodiment variant at least one air inlet and/or at least one section of a flow passage and/or at least one jet engine and/or at least one jet nozzle is used as a common component for two (or more) of such drive flow passages. This can be realized in a simple manner by suitably arranged bifurcations and/or junctions in the region of flow passages. According to one embodiment of the drive flow passage (several of which can also be accommodated in the aircraft as explained above), this comprises:

A first curvature section, adjoining the air inlet, for flow deflection,

A first longitudinal section, adjoining the first curvature section and extending in the flight direction, for flow guidance in the flight direction, A second curvature section, adjoining the first longitudinal section, for flow deflection, and A second longitudinal section, adjoining the second curvature section and extending against the flight direction, for flow guidance against the flight direction.

The term "section extending in the flight direction" is hereby intended to mean that the respective section bridges a certain distance seen in the flight direction. To this end it is not absolutely necessary for the respective section to run (exactly) parallel to the flight direction. Instead, a course at an angle to the flight direction or longitudinal direction of the aircraft is also conceivable, wherein, however, an angle of this type is preferably relatively small (e.g., less than 30°, in particular less than 20°). In a special embodiment the first longitudinal section and/or the second longitudinal section runs essentially in a straight line. In a special further development of this embodiment, the drive flow passage hereby has two curvature sections, which respectively provide a flow deflection by approx. 180° (e.g., in the range of 170° to 190°).

There are also different possibilities for the particular arrangement or orientation of the jet engine. In a preferred embodiment variant of the above-mentioned embodiment with first and second longitudinal sections and first and second curvature sections, it is provided, for example, that the first longitudinal section contains the jet engine. The advantage over an arrangement of the jet engine, e.g., in the second longitudinal section lies in that the flow losses incurred in the course downstream of the jet engine can be "handled" (compensated by higher engine capacity) better than flow losses or a high flow resistance upstream of the engine input.

In one embodiment at least a part of the jet engine, in particular the entire jet engine, seen in the flight direction is arranged upstream of the center of gravity of the aircraft and/or upstream of the geometric centroid of the contour of the body seen from above. This renders possible a particularly extensive improvement of the flight properties with otherwise problematic designs of the fuselage and wing body.

A preferred use of an aircraft of the type described here is the use as an unmanned reconnaissance and/or combat aircraft (UAV or UCAV) in particular with a body geometry that reduces the radar signature very extensively (e.g. by more than 99%).

BRIEF DESCRIPTION OF THE DRAWING FIGURES

The invention is described further below based on exemplary embodiments with reference to the attached drawings. They show.

DETAILED DESCRIPTION

Figure 1:
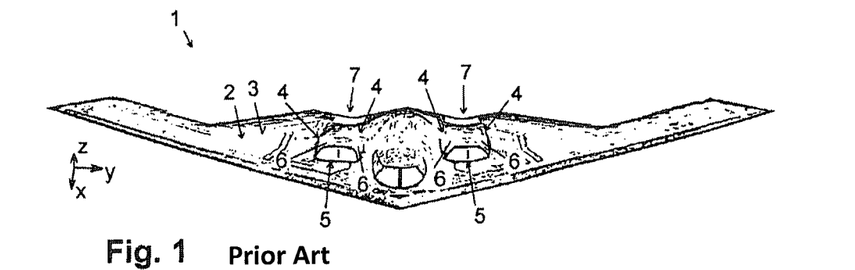
FIG. 1 an aircraft (Northrop B-2 Spirit) according to the prior art.
Figure 2:
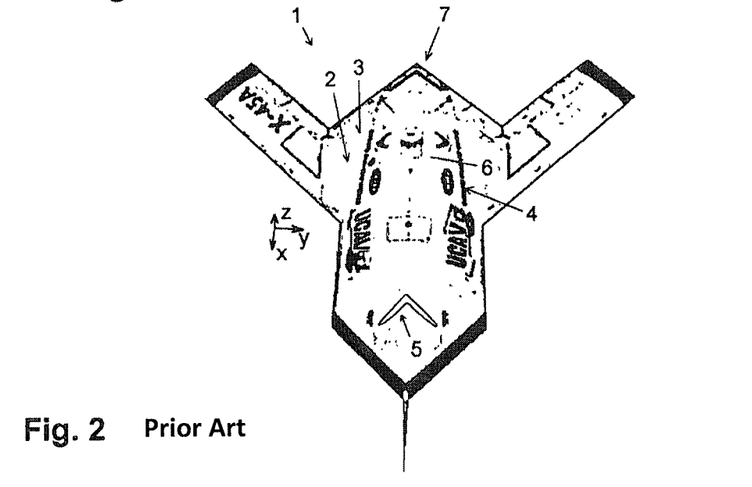
FIG. 2 a further aircraft (Boeing X-45) according to the prior art.
Figure 3:
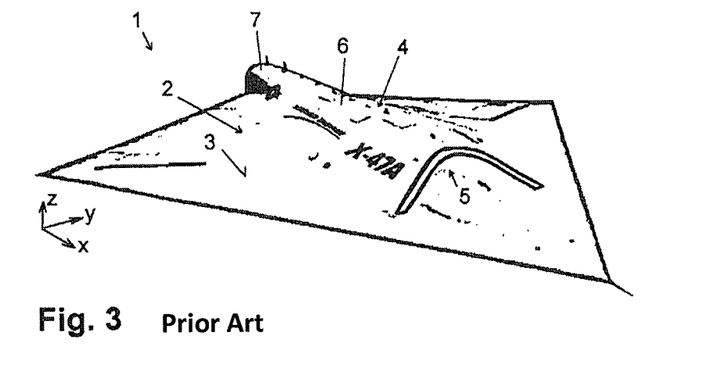
FIG. 3 a further aircraft (Northrop Grumman X-47 Pegasus) according to the prior art, FIG. 4 an aircraft according to an exemplary embodiment of the invention, FIG. 5 the aircraft of FIG. 4 with an emphasized detail in side view, FIG. 6 the aircraft of FIG. 4 with an emphasized detail in plan view, FIG. 7 a diagrammatic representation of the design geometry of drive flow passages with the aircraft from FIG. 4, FIG. 8 a representation corresponding to FIG. 7 according to a modified exemplary embodiment, FIG. 9 a representation corresponding to FIG. 7 according to a further modified exemplary embodiment, and FIG. 10 a representation corresponding to FIG. 7 according to a further modified exemplary embodiment.

FIGS. 1 through 3 show some examples of aircraft known from the prior art of the type of interest here.

Each of these aircraft 1 comprises a fuselage and wing body 2 with a body surface 3. Furthermore, each aircraft 1 comprises at least one drive flow passage 4, which runs from an air inlet 5 directed forwards (positive x direction) on the body surface 3 via a jet engine 6 through the body 2 to a jet nozzle 7 opening to the rear on the body surface 3.

As can be seen from FIGS. 1 through 3, the body 2 is respectively embodied in the manner of a "flying wing aircraft"—with flowing transitions between a hardly discernible fuselage and wings arranged on both sides thereof. This particular design of the body 2 is used for a more or less drastic reduction of the radar signature of the respective aircraft 1. In this context the unusual leading edge sweep and trailing edge sweep or a W-shaped serration of the trailing edge (FIGS. 1 and 2) are also of importance. Thus, radar waves impinging from the front or rear on the respective aircraft 1 are not reflected back forwards or to the rear, but sideways (in very narrow angular ranges). To achieve an extremely low radar signature, however, a delta configuration (FIG. 3) is generally superior to the other designs.

The coordinate systems plotted in the figures designate a flight direction or longitudinal direction "x", a transverse direction "y" and a height direction "z" of the respective aircraft.

A grave problem with the aircraft 1 shown in FIG. 3 (with a "basic delta form") lies in that the so-called aerodynamic neutral point seen in the flight direction (x direction) lies relatively far forward of the center of gravity of the volume. The position of the aerodynamic neutral point is hereby determined by the special design of the body 2, whereas the position of the center of gravity is determined decisively by the accommodation of relatively dense components, such as the jet engine 6 and fuel supplies in a center and rear body region. It should be considered here that the jet engine 6 is arranged downstream of the assigned air inlet 5 and the air inlet 5 in turn is not arranged particularly far forwards, since the discontinuities, formed by this air inlet 5, of the body surface 3 would otherwise be relatively easily discernible by a "radar glance cast" from the front on the aircraft 1.

Although the arrangement of the air inlets 5 on the top of the respective body 2 that can be seen with the aircraft 1 shown in FIGS. 1 through 3 leads to a concealment of the same for radar radiation, which e.g., starting from a ground radar impinges on the aircraft 1 obliquely from below, a concealment of this type does not result for radar radiation incident horizontally or obliquely from above (e.g., emitted by an air-borne radar system).

An increase, which is very disadvantageous with respect to the center of gravity, of the distance seen in the x-direction between air inlet 5 and jet engine 6 results with the aircraft 1 shown in that immediately downstream of the openings of the air inlets 5 regions curved in a siphon-like manner with relatively large construction length are provided, in order to prevent a direct radar view of the engine 6.

The very unfavorable flight properties of aircraft of the shown type result in flight instabilities, which, to put it simply, are comparable to those of a dart that is thrown "the wrong way around." Accordingly, the aircraft 1 shown would crash if the flight position were not permanently corrected by complex avionics. For this purpose permanently suitable control commands must be sent to the components provided for this (e.g. adjustable control surfaces on the wings, etc.).

Some exemplary embodiments of improved aircraft with respect to the flight properties and/or with respect to a low radar signature are described below with reference to FIGS. 4 through 10.

Figure 4:
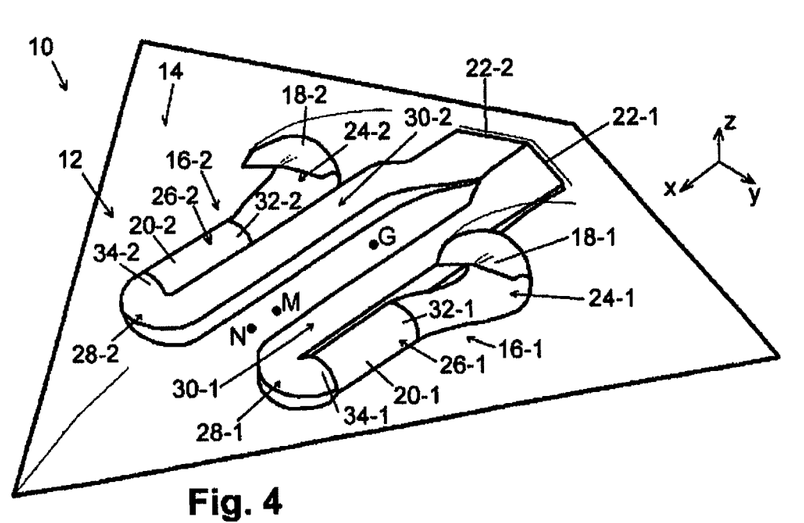

FIG. 4 illustrates an aircraft 10 (e.g., unmanned aircraft) which, like the known aircraft already described above, has a fuselage and wing body 12 with a body surface 14 and at least one drive flow passage, here the two drive flow passages 16-1 and 16-2.

The two drive flow passages 16-1, 16-2 are arranged symmetrically to a vertical longitudinal center plane of the body 12. Therefore, although only the structure of the (left) drive flow passage 16-1 is explained in more detail below it should be recognized that the other (right) drive flow passage 16-2 has the same structure.

The drive flow passage 16-1 runs starting from an air inlet 18-1 directed forwards (x direction) on the body surface 14 via a jet engine 20-1 to a jet nozzle 22-1 opening to the rear on the body surface 14.

The reference numbers of components provided several times in an embodiment but analogous in their effect, such as e.g. the mentioned air inlets, engines, etc. are numbered consecutively (respectively supplemented by a hyphen and a consecutive number). Reference is also made below to individual such components or to the totality of such components by the reference number without supplement.

A special feature of the aircraft 10 lies in that the jet engine 20-1 seen in the flight direction x is arranged upstream (and not downstream) of the assigned air inlet 18-1 and the drive flow passage 16-1 has curvature sections embodied and arranged in a suitable manner for this. In the case of the exemplary embodiment shown, the drive flow passage 16-1 comprises:

A first curvature section 24-1, adjoining the air inlet 18-1, for flow deflection, wherein a single-axis flow deflection by 180°, in the vertical x-z plane, is provided.

A first longitudinal section 26-1, adjoining the first curvature section 24-1 and extending in the flight direction (positive x-direction), for flow deflection in the flight direction, wherein a course more or less exactly in the x direction is provided, and this first longitudinal section 26-1 contains the jet engine 20-1, the extension of which claims essentially the entire construction length of the section 26-1, A second curvature section 28-1, adjoining the first longitudinal section 26-1, for flow deflection, wherein here likewise a deflection by 180°, but in the horizontal x-y plane, is provided, A second longitudinal section 30-1, adjoining the second curvature section 28-1 and extending against the flight direction (negative x direction), for flow guidance against the flight direction, wherein, as for the first longitudinal section, a course is provided essentially exactly in the (negative) x direction, so that the two longitudinal sections 26-1 and 30-1 seen in the transverse direction run next to one another and parallel or antiparallel to the positive x direction.

Advantageously, the center of gravity M of the aircraft 10 lies relatively far forwards and thus near to the aerodynamic neutral point N. This results in considerably improved flight properties or a higher stability for the body 12 embodied according to a flying-wing aircraft design. Furthermore, the shift of the air inlets 18 relatively far to the rear is advantageous in this respect. This reduces any undesirable yawing moments occurring, in particular at sideslip angles. Furthermore, in FIG. 4 the position of the geometric centroid of the contour, seen from above, of the body 12 is plotted and labeled by G.

The design of the body 12 in the exemplary embodiment shown is used to reduce the radar signature of the aircraft 10. In this context the arrangement of the air inlets 18 is likewise highly advantageous, since these are better concealed from radar radiation by body regions lying further forwards, and a direct radar view on the jet engine 20-1 is prevented very effectively (by the curvature section 24-1).

The aircraft 10 shown with air inlets 18 shifted to the rear and the "inverted engine installation" therefore eliminates in an elegant manner the problems of aircraft according to the prior art explained at the outset.

These advantages already result when at least a part of the jet engine 20 is arranged upstream of the air inlet 18. Deviating from the representation according to FIG. 4, therefore e.g., the air inlet 18 could also be arranged further forwards relative to the jet engine 20, as far as into a region (seen in the x direction) between an engine input 32 and an engine output 34. However, in general an arrangement is better, as shown, in which the entire engine 20 is arranged upstream of the air inlet 18.

The term "jet engine" should here (to delimit it from the other sections of the drive flow passage) designate those regions in which the components necessary for the acceleration of the flow medium (air or combustion products) with the respective engine type are accommodated. With a conventional engine type, these are at least one compressor stage, a subsequent combustion chamber and a finally adjoining turbine (to drive the at least one compressor stage).

In the exemplary embodiment shown, the air inlet 18 is located very advantageously downstream of the center of gravity M as well as (just) downstream of the geometric centroid G.

In contrast, in the exemplary embodiment shown the jet engine 20 is located completely upstream of the geometric centroid G and at least a part of the jet engine 20 upstream of the center of gravity M.

Deviating from the representation according to FIG. 4, in which the drive flow passage is embodied two-fold (individual drive flow passages 16-1 and 16-2), symmetrically to the vertical longitudinal center plane of the body 12, one or more drive flow passages could also be arranged asymmetrically to the vertical longitudinal center plane.

Likewise deviating from the representation according to FIG. 4, thus e.g., also only one single drive flow passage, could be provided (preferably) symmetrically or (less preferably) asymmetrically to the vertical longitudinal center plane. To create symmetry, the first and second curvature sections 24 and 28 could provide respectively curved flow courses in the x-z plane. Such a drive flow passage arranged centrally could furthermore be combined e.g., with at least one pair of drive flow passages arranged symmetrically to one another eccentrically (e.g. as shown in FIG. 4).

Further possible modifications of the arrangement geometry or arrangement topography shown in FIG. 4 merely by way of example are shown by the explanations provided below in connection with FIGS. 7 through 10.

Figure 5:
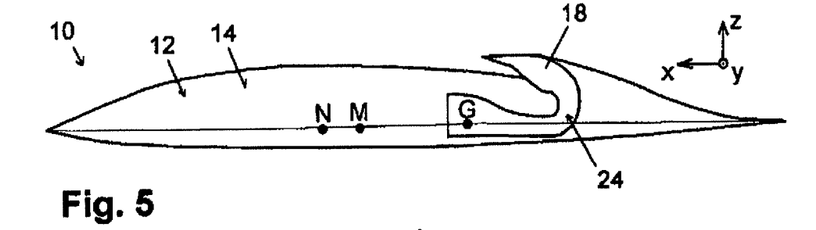
Figure 6:
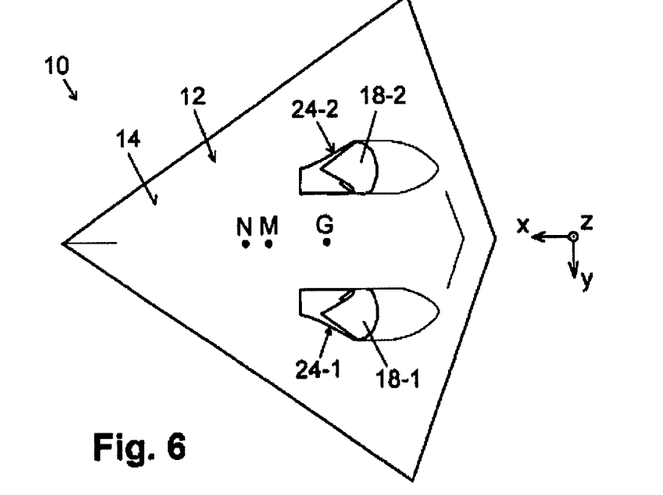

FIGS. 5 and 6 illustrate once again in a side view (FIG. 5) or plan view (FIG. 6) the arrangement lying very far to the rear of the air inlets 18 with the first curvature section 24 directly adjoining it.

It can be clearly seen in these figures how the opening of the air inlet 18 on its outside is delimited by a region of the body 12 tapering forwards. Thus, advantageously a certain run length for the incoming air before reaching the curvature section 24 is created. The two side edges of the tapering body regions with respect to the reduction of the radar signature, as can be seen from FIG. 6, are oriented parallel to the side front wing edges.

Deviating from the exemplary embodiment shown, the opening of the air inlet 18 or the edges thereof could also be designed differently. An orientation of the opening edges parallel to the rear (instead of front) wing edges can also be favorable for a low radar signature.

Moreover, FIG. 5 shows on the curvature section 24 a special feature quite generally advantageous for curvature sections provided within the scope of the invention. This lies in that the respective curvature section (here: curvature section 24) for achieving a certain deflection angle ("desired deflection angle," here: 180°) provides in a first course region a deflection about a somewhat larger angle (here: approximately 190°, in general, e.g., up to 20% larger than the "desired deflection angle") and in a second course region directly adjoining it a relatively small opposite curvature (here: approx. −10°). (This special feature is also indicated in the diagrammatic representations of FIGS. 7 through 10). Thus under certain vertical installation space requirements, the flow resistance can be advantageously reduced compared to a curvature that is uniform throughout (e.g., semicircular to achieve a 180° curvature).

To sum up, with the exemplary embodiment according to FIGS. 4 through 6, in contrast to the prior art, the air inlet 18 is shifted to the rear, whereas the jet engine 20 in inverse installation position (with the compressor stage at the rear) is shifted forwards. The air inlet 18 is connected via a 180° bend (first curvature section 24) specially designed for good efficiency to the jet engine 20. The engine exhaust gases arrive via the further 180° bend (second curvature section 28) in a nozzle pipe (longitudinal section 30) running antiparallel to the jet engine 20. Preferably, the jet nozzle 22 (or combination of individual jet nozzles 22-1 and 22-2), as shown, is a flat nozzle, preferably with yaw vector control.

In an advantageous further development, the drive flow passage 16 in its region lying up to the jet engine 20, that is, e.g., in particular in the region of the air inlet 18, has at least one air bifurcation. The air branched off at the respective point can be provided, e.g., for cooling purposes. Alternatively or additionally this air can be fed to a so-called ejector in the region of a "nozzle pipe" (longitudinal section 30) or the jet nozzle 22. For this an air flow passage (not shown) can run e.g., starting from the air inlet 18 to the jet nozzle 22. Advantageously, a relatively small length results for an air flow passage of this type. Moreover, auxiliary air inlets that impair a low radar signature can thus be avoided.

In accordance with the present invention aircraft with extremely low radar signature are achieved and while also realizing comparatively good flight properties. In particular, e.g., the following advantages can be achieved:

The critical inlet for the signature is shifted to the rear region of the aircraft, whereby it is largely concealed by the configuration (body) itself from incident radar waves, in particular in the important front lower region. At the same time a direct view of the engine is prevented.

The construction length of the inlet can be considerably increased and provides more space for radar-absorbing measures in contrast to the inlet lying at the front.

The particularly heavy engine can be shifted further forwards and the specifically light inlet to the rear. This has an advantageous effect in terms of center of gravity and improves the utilization of the configuration very clearly, as has been described above.

The lateral forces at the inlet, which lead to an unstable yawing moment with a front position, particularly with large specific mass flow rates at the start, in this case generate a stabilization of the yawing movement, whereby the configuration in the entire flight envelope is at least slightly stable. The yaw control potential necessary and the controller expenditure is reduced markedly thereby.

Cooling flows and ejectors for the nozzle etc. (all specifically light components) with low-signature configurations should not be supplied via auxiliary inlets lying outside, but from the engine input. With an inlet lying at the rear, the feed lines are very short.

With the correct design of the 180° bend at the inlet, the bend loss can be kept low, so that the inlet efficiency is also good.

Some modifications of the arrangement geometry in the region of the drive flow passage(s) are explained below with reference to FIGS. 7 through 10 by way of example.

FIG. 7 shows again the basic arrangement geometry of the already described exemplary embodiment of FIGS. 4 through 6. With this embodiment in the transverse direction (y direction) the two separate drive flow passages 16-1 and 16-2 are provided separated from one another. Accordingly, two jet engines 20-1 and 20-2 are provided. These are respectively "installed backwards," i.e., the engine inputs 32 thereof lie in the longitudinal direction (x direction) respectively downstream of the engine outputs 34 (see also FIG. 4).

Figure 7:
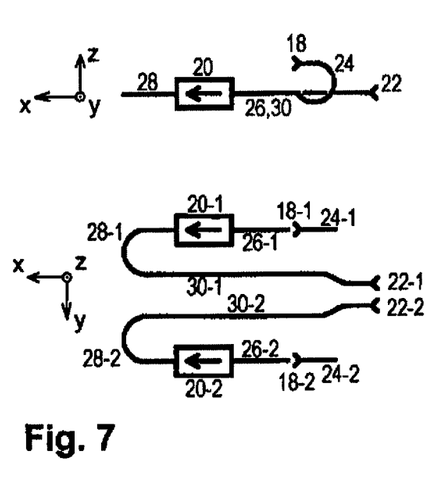
Figure 8:
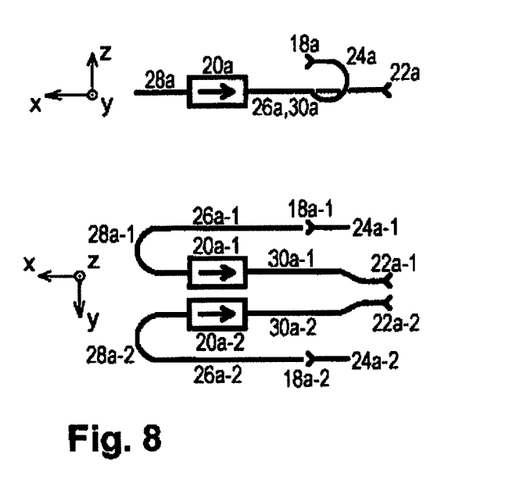
Figure 9:
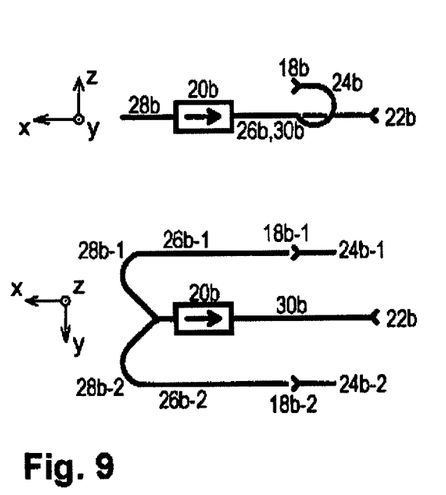
Figure 10:
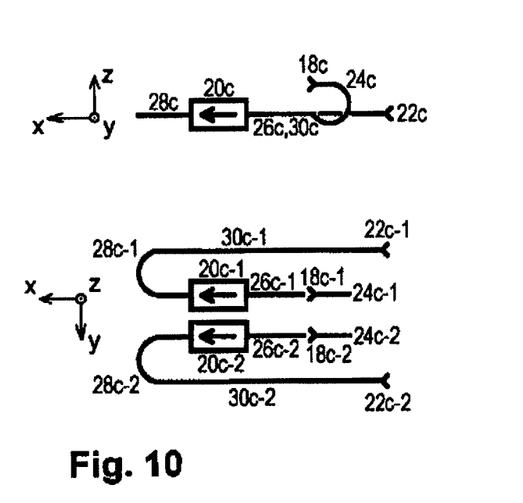

FIGS. 8 through 10 show some possible modifications in a diagrammatic representation corresponding to FIG. 7. For components with the same action, the same reference numbers are hereby used, respectively supplemented by a lower case letter to distinguish the embodiment. In the following explanation essentially only the differences from the already described exemplar embodiments are dealt with and otherwise we refer explicitly to the description of previous exemplary embodiments.

FIG. 8 shows an arrangement geometry modified with respect to FIG. 7, in which jet engines 20a are not arranged in the region of the first longitudinal sections 26a, but in the region of the second longitudinal sections 30a. Accordingly, these jet engines 20a are provided in "normal installation position." This modification is in general more unfavorable with respect to the flow losses than the geometry of FIG. 7, but in certain cases can also provide advantages.

A further possible modification of the designs according to FIGS. 7 and 8 lies in that several drive flow passages are not embodied completely separately, but in part by components used in common. Thus for example instead of the two jet nozzles shown separately in FIGS. 7 and 8, alternatively a single jet nozzle used in common for the two drive flow passages could also be provided, which is connected via a flow junction (y piece") to the longitudinal sections 30-1 and 30-2 running towards the rear.

FIG. 9 illustrates a similar modification, in which a flow junction of this type is already arranged directly downstream of second curvature sections 28b-1 and 28b-2, which in turn opens into a jet engine 20b used in common.

FIG. 10 shows a further modification with respect to the embodiment according to FIG. 7, in which second curvature sections 28c-1 and 28c-2, as in FIG. 7, lie in the x-y plane, but deflect the flow, seen in the y direction, not to the aircraft center, but to the outside of the aircraft.

Alternatively or additionally to the "two-fold" drive flow passages shown in FIGS. 7 through 10 the respective aircraft could e.g. also be equipped with a "single" drive flow passage.

The embodiments according to FIGS. 7 through 10 commonly have the first curvature section and the second curvature section respectively providing a flow deflection curved in a single-axis manner. However, this is not mandatory. Deviating therefrom, the first curvature section and/or the second curvature section e.g., could provide a double-axis curvature.

Moreover, the exemplary embodiments according to FIGS. 7 through 10 have in common that the first curvature section respectively provides a curvature in the vertical x-z plane and the second curvature section respectively provides a curvature in the horizontal x-y plane. This is not mandatory either. In principle the respectively curvature axes (or in the case of a double-axis curvature a "main curvature axis") can be provided more or less as desired and largely independent of one another. In a special embodiment deviating from the examples according to FIGS. 7 through 10, for example it is provided that the first curvature section as well as the second curvature section provide either essentially a curvature in the x-z plane or a curvature essentially in the x-y plane.

Quite generally it is important only that the "linking" of all curvatures of a drive flow passage in total leads to the air flow starting from its orientation in the negative x-direction (at the air inlet) via a partially curved course of the drive flow passage finally oriented again in the negative x-direction leaves the aircraft body (at the jet nozzle or nozzles).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An aircraft, comprising:
   a fuselage;
   wing body;
   a jet engine; and
   at least one drive flow passage, which runs from an air inlet, which is directed forward on a body surface of the wing body, via the jet engine through the wing body to a jet nozzle that opens towards the rear on the body surface,
   wherein at least a part of the jet engine is arranged upstream of the air inlet seen in a flight direction of the aircraft and the at least one drive flow passage has curvature sections configured to couple the air inlet to the jet engine,
   wherein the entire jet engine, seen in the flight direction, is arranged upstream of the center of gravity of the aircraft or upstream of a geometric centroid of a contour of the body seen from above.

2. The aircraft according to claim 1, wherein the entire jet engine is arranged upstream of the air inlet seen in the flight direction of the aircraft.

3. The aircraft according to claim 1, wherein the air inlet, seen in the flight direction, is arranged downstream of a center of gravity of the aircraft or downstream of a geometric centroid of a contour of the wing body seen from above.

4. The aircraft according to claim 1, wherein an opening of the air inlet is delimited on its outside by a region of the wing body tapering forwards to a point.

5. The aircraft according to claim 1, wherein the at least one drive flow passage is arranged as two drive flow passages arranged symmetrically to a vertical longitudinal center plane of the wing body.

6. The aircraft according to claim 1, wherein the at least one drive flow passage comprises:
   a first curvature section, adjoining the air inlet, the first curvature section configured for flow deflection,
   a first longitudinal section, adjoining the first curvature section and extending in the flight direction, the first longitudinal section configured for flow guidance,
   a second curvature section, adjoining the first longitudinal section, the second curvature section configured for flow deflection, and
   a second longitudinal section, adjoining the second curvature section and extending against the flight direction, the second longitudinal section configured for flow guidance.

7. The aircraft according to claim 6, wherein the first longitudinal section contains the jet engine.

8. The aircraft according to claim 6, wherein at least one of the curvature sections has a first course region configured for flow deflection about a first angle and a second course region directly adjoining it with opposite curvature direction configured for flow deflection about a second angle, which is smaller than the first angle.

* * * * *